UNITED STATES PATENT OFFICE 2,390,511

COMPOSITIONS OF MATTER AND METHOD OF PREPARATION THEREOF

Allan E. Chester, Highland Park, and Frederick F. Reisinger, Waukegan, Ill., assignors to Poor & Company, Chicago, Ill., a corporation of Delaware No Drawing. Application April 24, 1944, Serial No. 532,532

14 Claims. (Cl. 252—1)

This invention relates to new and useful compositions of matter, and to a new and improved method for the preparation thereof.

One of the objects of the invention is to produce new and improved water soluble derivatives of piperonyl aldehyde.

Another object of the invention is to provide new compositions of matter which are especially adapted for use in electroplating baths, particularly alkaline cyanide-zinc plating baths.

A further object of the invention is to provide a new and improved method for producing compositions of the type described above. Other objects will appear hereinafter.

In accordance with the invention, it has been found that new and useful compositions of matter are obtained by reacting together piperonyl aldehyde and an aldonic acid, preferably gluconic acid. The reaction is preferably effected in the presence of a lower fatty acid, such as for example acetic acid, which acts as a catalyst and may either be allowed to remain as a part of the final composition or be neutralized. The reaction can also be effected without a catalyst but a longer period of heating is then normally required.

A further feature of the invention is the preparation of compositions of the type described dissolved in organic solvents, for example, diethylene glycol monobutyl ether $(C_4H_9.O.CH_2.CH_2.O.CH_2.CH_2.OH)$ also known as butyl Carbitol, methyl "Cellosolve" Formal and ethyl "Cellosolve" Formal or other water miscible organic solvents. The resultant compositions, when added to aqueous alkaline baths, as for example alkaline zinc-cyanide electroplating baths, form emulsions which break almost immediately into clear solutions. These solutions will readily pass through a filter, and the reaction products of the piperonyl aldehyde with the aldonic acid contained therein are not removed by filtration. Hence, the compositions of the invention are especially useful in the preparation of electroplating baths which sometimes have to be filtered for the removal of impurities.

While the compositions of the invention are especially useful for the preparation of electroplating baths, particularly alkaline zinc-cyanide plating baths, it will be understood that they can be used for other purposes, as for example in the manufacture of perfumes.

The invention will be illustrated but is not limited by the following examples, in which the quantities are stated in parts by weight unless otherwise indicated:

Example I

Piperonyl aldehyde (piperonal), a solution of 50% gluconic acid, and a solution of 91% acetic acid are mixed together in proportions within the following range:

|  | Parts |
|---|---|
| Piperonyl aldehyde | 1–4.2 |
| Gluconic acid (50% concentration) | 12–22 |
| Acetic acid (91% concentration) | 17–9 | and the mixture is digested with agitation for one hour at about 50° C. to 60° C. The product is a clear brown liquid. It is then preferably diluted with butyl Carbitol in proportions preferably within the range of 10 parts to 30 parts. The solvent solution of the reaction product of piperonyl aldehyde with gluconic acid in the presence of acetic acid is also a clear brown liquid.

Example II

The acetic acid can be omitted in carrying out Example I, in which case, however, the heating of the piperonyl aldehyde with the gluconic acid is preferably continued for about 6 to 10 hours. A product having similar properties is obtained which is soluble in butyl Carbitol and other similar water miscible organic solvents.

Example III

This example illustrates the application of the invention to the preparation of cyanide-zinc plating baths. The compositions prepared as in Examples I and II, when added to an ordinary cyanide-zinc plating bath in proportions varying preferably within the range from 3 cc. per gallon to 60 cc. per gallon, produce a brightening effect which is especially marked or pronounced when these compositions are employed in electrolytes of the type described and claimed in our application Serial No. 525,324, filed March 6, 1944. If desired, the compositions can be added in increments or continuously to electroplating baths in order to produce brightening effects.

Piperonyl aldehyde per se is insoluble in water and in alkaline zinc plating baths, whereas the compositions of the invention either form emulsions (when they are prepared without the organic solvent), or form emulsions which break to give clear solutions (when they are prepared with the organic solvent). Thus, when the compositions of Examples I or II are added to a cyanide-zinc plating bath, the emulsion forms and breaks immediately and the bath becomes a clear light yellow color. It can be filtered without filtering out any of the reaction product. The cyanide-zinc plating baths prepared with these compositions are preferably employed with current densities within the range of about 10 to 50 amperes per square foot.

In the preparation of the compositions of the invention other aldonic acids may be used instead of gluconic acid, as for example mannonic, arabonic, galactonic, and xylonic. All of these exist in alpha and beta lactone forms.

The invention is subject to certain other variations and modifications in the manner of its practical application; thus, in the reaction between the piperonyl aldehyde and the aldonic acid, somewhat higher temperatures may be used but care should be taken to avoid temperatures which are sufficiently high to cause caramelizing. Other acids may be employed as a catalyst, as for example propionic acid. If other acids are employed as catalysts and the products are to be used in electroplating baths, care should be taken to avoid the use of acids that might have a harmful effect on the bath itself or upon the electroplating operation.

One of the advantages of the invention is the provision of new and improved compositions of matter which are substantially water soluble and can be added to aqueous baths, particularly alkaline aqueous baths, in relatively large percentages as compared with piperonyl aldehyde. These new derivatives also produce results which are not obtained with the parent substances. Likewise, the invention provides a new and improved method for producing compositions of the type described.

The invention is hereby claimed as follows:

1. The product of the reaction of piperonyl aldehyde with an aldonic acid.

2. The product of the reaction of piperonyl aldehyde, an aldonic acid, and a lower fatty acid.

3. The product of the reaction of piperonyl aldehyde and gluconic acid.

4. The product of the reaction of piperonyl aldehyde, gluconic acid, and acetic acid.

5. A composition comprising a reaction product of piperonyl aldehyde with an aldonic acid dissolved in a water miscible organic solvent inert to and soluble in alkaline aqueous solutions, said composition being a clear liquid which, when added to an alkaline aqueous bath, forms an emulsion that breaks immediately and dissolves in said bath.

6. A composition comprising a reaction product of piperonyl aldehyde with gluconic acid dissolved in a water miscible organic solvent inert to and soluble in alkaline aqueous solutions, said composition being a clear liquid which, when added to an alkaline aqueous bath, forms an emulsion that breaks immediately and dissolves in said bath.

7. A composition comprising the reaction product of piperonyl aldehyde and gluconic acid in proportions corresponding to approximately 1-4.2 parts by weight of piperonyl aldehyde to 12-22 parts by weight of gluconic acid (calculated as 50% gluconic acid), diluted with diethylene glycol monobutyl ether in proportions effective to produce a solution which, when added to alkaline aqueous baths, temporarily forms an emulsion that breaks to a clear solution.

8. A method of preparing a reaction product of piperonyl aldehyde with an aldonic acid which comprises heating piperonyl aldehyde with an aldonic acid.

9. A method of preparing a reaction product of piperonyl aldehyde with gluconic acid which comprises heating piperonyl aldehyde with gluconic acid.

10. A method of preparing a reaction product of piperonyl aldehyde with an aldonic acid which comprises heating piperonyl aldehyde with an aldonic acid in the presence of an acid catalyst.

11. A method of preparing a reaction product of piperonyl aldehyde with gluconic acid which comprises heating piperonyl aldehyde with gluconic acid in the presence of acetic acid at a temperature within the range of about 50° C. to 60° C.

12. A method of preparing a composition of matter soluble in water and alkaline aqueous solutions which comprises heating together piperonyl aldehyde and an aldonic acid at temperatures below those at which substantial caramelizing occurs and diluting the reaction mixture with a water miscible organic solvent inert to and soluble in alkaline aqueous solutions.

13. A method of preparing a composition of matter soluble in water and alkaline aqueous solutions which comprises reacting together piperonyl aldehyde with gluconic acid in the presence of acetic acid at a temperature of about 50° C. to 60° C. and thereafter diluting the reaction mixture with a water miscible organic solvent inert to and soluble in alkaline aqueous solutions.

14. A method of preparing new and improved reaction products which comprises reacting together piperonyl aldehyde, gluconic acid, and acetic acid at temperatures from about 50° C. to about 60° C. in the proportions approximately corresponding to 1 to 4.2 parts by weight of piperonyl aldehyde, 12 to 22 parts by weight of approximately 50% gluconic acid, and 17 to 9 parts by weight of acetic acid, and then diluting the reaction mixture with 10 to 30 parts by weight of diethylene glycol monobutyl ether.

ALLAN E. CHESTER.
FREDERICK F. REISINGER.